United States Patent

[11] 3,566,789

[72] Inventors: Robert F. Hecht
115 Broadstreet Road, Centerville, Ohio 45459;
Stanley Perdue, 345 Blatty Drive, Xenia, Ohio 45385
[21] Appl. No. 755,059
[22] Filed Aug. 26, 1968
[45] Patented Mar. 2, 1971

[54] METHOD OF MANUFACTURING A COMPOSITE LETTERPRESS PLATE WITH SCARF DEFINING POCKETS
3 Claims, 6 Drawing Figs.
[52] U.S. Cl. ................................................. 101/401.1, 18/30, 101/395, 101/378, 264/262
[51] Int. Cl. ........................................................ B41c 1/18, B41d 3/08
[50] Field of Search ............................................ 101/401.1, 395, 378, 415.1; 249/96; 264/261, 262; 156/245; 18/30

[56] References Cited
UNITED STATES PATENTS

| | | | |
|---|---|---|---|
| 3,029,730 | 4/1962 | Parrish et al. | 101/395X |
| 3,125,952 | 3/1964 | Bungay | 101/395X |
| 3,424,635 | 1/1969 | Grandinetti et al. | 101/395X |

Primary Examiner—Robert E. Pulfrey
Assistant Examiner—J. Reed Fisher
Attorney—Marechal, Biebel, French & Bugg ABSTRACT: A novel printing plate is produced by placing an electrotype shell and a partial base in a mold cavity, holding them in place in properly spaced relation to each other as by means of vacuum and hydraulically or pneumatically operated hold down mechanisms, and filling the mold cavity with molten plastic or similar synthetic material from a plastic injection machine. The partial base skeleton includes scarf cavities, and portions of this skeleton may be embedded in the plastic when it hardens into the final shape.

Patented March 2, 1971
3,566,789
2 Sheets-Sheet 1
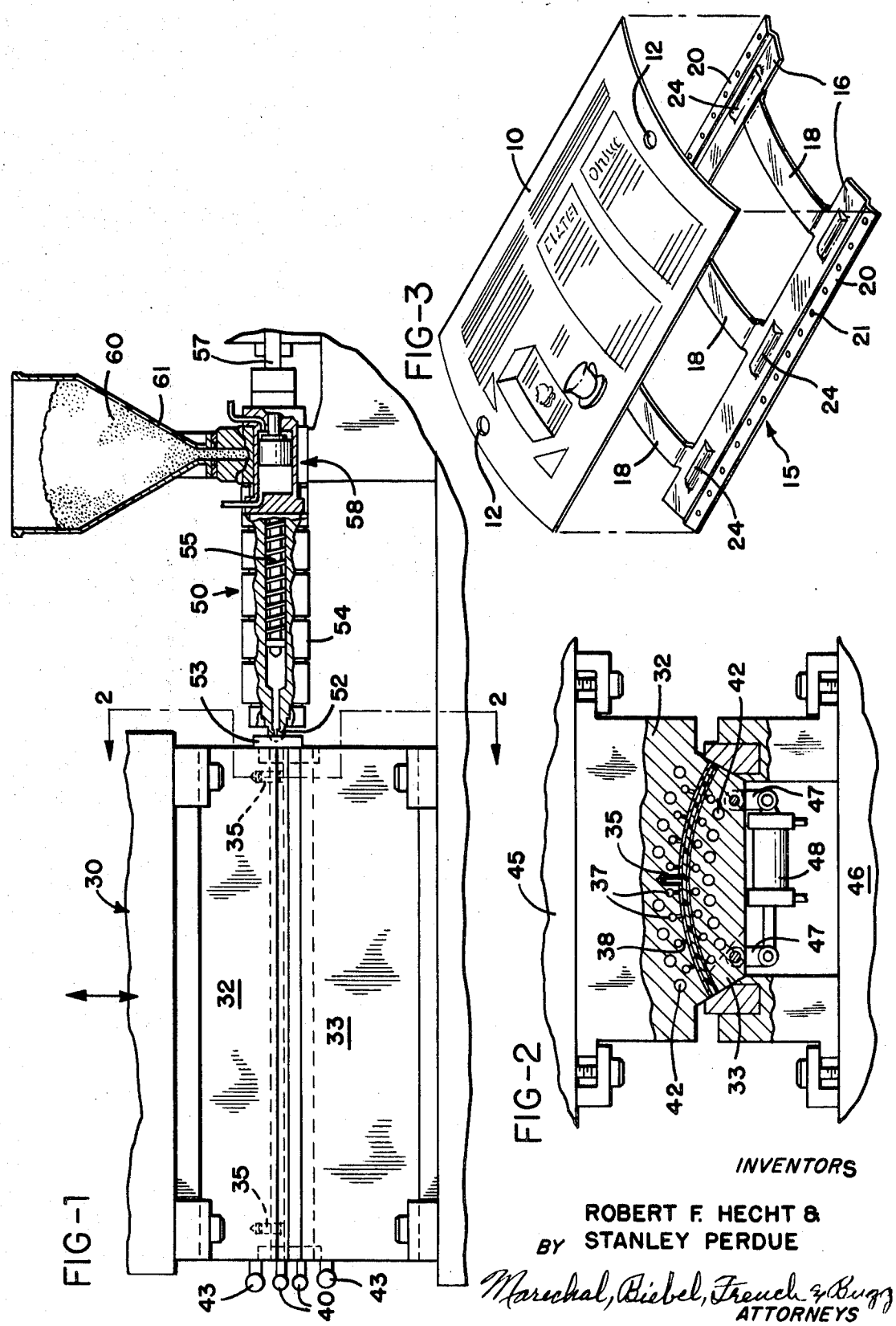
INVENTORS
ROBERT F. HECHT &
BY STANLEY PERDUE
Marechal, Biebel, French & Bugg
ATTORNEYS

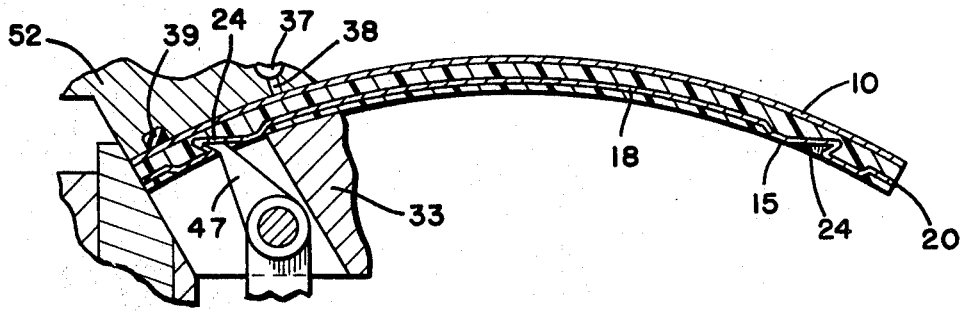
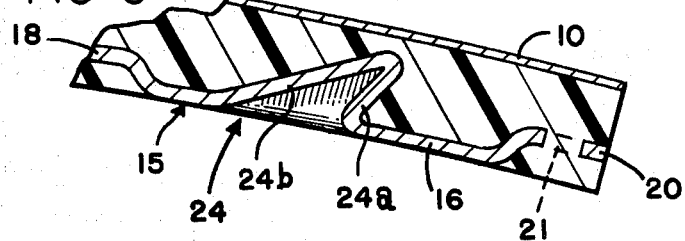
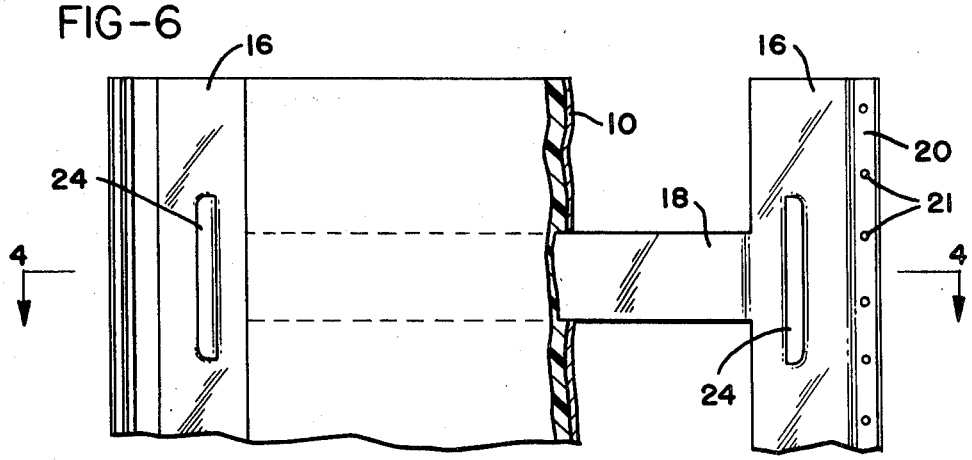

METHOD OF MANUFACTURING A COMPOSITE LETTERPRESS PLATE WITH SCARF DEFINING POCKETS

BACKGROUND OF THE INVENTION

In a process widely used at present, an electrotype shell is laminated to an aluminum base through sheets of plastic, nylon, and cheesecloth all of which are heated as a "sandwich" unit and squeezed together under a hydraulic ram, then cooled while still under pressure.

After these components are laminated together as 1 unit, this unit is then trimmed of excess shell and plastic, and then placed in a boring machine where it is machined to the proper thickness for the press. Often plates have been damaged, many beyond repair, by accidentally shaving corners or other areas too thin. Either expensive and time consuming repairs are needed, or a new plate must be made.

The plate may then have a hole punched in each end to accommodate the pins of the pin register machinery. Then in sequence the plate is "tailed" on one machine, scarfed on another machine, and end cut on still another machine. It is then routed before being mounted on a press.

One disadvantage in this process is the high cost of the aluminum bases used. They are not reused and instead can only be disposed of as scrap. Other significant disadvantages include the many hours of labor consumed in completing the various operations.

In the manufacturing of the electrotype shell, a plastic "mat," typically of a vinyl plastic is made and used as a master for construction of the shell by electroplating. Once these mats are no longer needed they are disposed of as waste.

SUMMARY OF THE INVENTION

The novel process provided hereby uses, instead of the aluminum bases, partial bases made of inexpensive sheet metal, which may be punched out on a punch press. These partial bases or base skeletons, have the scarf catch cavities punched into them, eliminating the scarfing operating which consumes thousands of man hours annually.

By using injection molding, these plates can be cast to the exact thickness required by various printing presses, thus eliminating the need for placing them in a boring machine. The material from old mats can be cut up and reused in the injection molding. By punching register pin holes in the electrotype shells before they are cast in the injection mold, they can be placed in the mold in the proper position, in relation to the partial base and the plate can be cast to exactly the proper width, this eliminating the tailing operation.

The objects and advantages of this invention include, providing an improved printing surface by producing plate with a more level printing surface; eliminating the boring machine operation by casting plates at proper thickness; reducing press make ready time by producing a plate of uniform thickness; eliminating the use and cost of aluminum bases; reducing fill in of originals before molding and fill in of shells before casting; greatly reducing the necessity for close tedious, and time consuming routing; eliminating the scarfing operation; eliminating some pin register operations by casting a plate to proper width, and permitting reusing waste or old molding vinyl plastic from the electrotype manufacturing operation.

Other objects and advantages of the invention will be apparent from the following description, the accompanying drawings and the appended claims.

BRIEF DESCRIPTION OF THE DRAWINGS

FIG. 1 is a side elevation showing a typical molding press and adjoining injection molding machine for use in manufacturing printing plates according to the invention;

FIG. 2 is a view, partially in section, taken generally along 2–2 in FIG. 1;

FIG. 3 is a perspective view of a typical electrotype shell and the partial base or skeleton provided by the invention;

FIG. 4 is a cross-sectional view through a typical printing plate manufactured according to the invention, and showing a fragment of the molding dies;

FIG. 5 is an enlarged view of one end segment of FIG. 4, showing the scarf opening formed in the completed plate; and FIG. 6 is a bottom view of the plate shown in FIG. 4, with a central segment of the plate broken away exposing part of the shell on the right-hand side, and also indicating generally the section along which FIG. 4 is taken.

DESCRIPTION OF THE PREFERRED EMBODIMENT

Referring first to FIGS. 3, 4 and 5, a typical electrotype shell 10 is shown provided with register holes 12 which may be formed one in the center of each end of the shell. This shell becomes the active printing surface of the plate, the upper surface as shown in FIG. 3 being formed with a relief printing surface in a known manner. Beneath the electrotype shell in FIG. 3 there is a partial or skeleton base 15, which together with the thermoplastic material forming the major part of the completed plate, is molded to the rear surface of the shell 10. This partial base includes side members 16 joined by a plurality of crosspieces 18, and these crosspieces preferably are offset somewhat upwardly from the side members 16. Furthermore, each of the side members has an offset outer lip portion 20 which preferably is provided with one or more holes or similar apertures 21, through which the plastic material flows in its molten state during manufacture of the plate.

The partial base is also provided along each of the side members 16 with a plurality of scarf cavities 24. These cavities, as can be seen more clearly in FIGS. 5 and 6, have a generally vertical wall 24a and a sloping wall 24b, and are essentially of the same shape as the scarf cuts formed in a metallic base section of known printing plates. These cavities cooperate with clamps on the plate cylinder of the printing press, to hold the plate in position.

According to the invention, the electrotype shell 10 and the partial base 15 are supported within a molding press 30, shown in FIGS. 1 and 2, including an upper die member 32 and a lower die member 33 having complementary mold cavity forming parts, which, when brought together, define the thickness, length and width of the resultant plate. The upper die 32 also is provided with one or more register pins 35 which cooperate with the register holes 12 in the electrotype shell to position the shell precisely within the upper mold cavity. Each of the upper and lower die members 32 and 33 is provided with a vacuum-retaining means (optional in the lower die member), in the form of a number of cross passages 37 having suction or vacuum-holding passages 38 extending therefrom to the surface of the respective die members. Suitable gaskets (see fragment 39, FIG. 4) surround the face of the vacuum-retaining means. All of these vacuum passages are connected, in known manner, to the vacuum manifolds 40 (FIG. 1) which in turn may be connected to a suitable vacuum source such as a pump. A control valve (not shown) is provided to permit the operator to switch the vacuum on and off as needed during the molding operation. Each of the die members 32 and 33 is also provided with heat exchange passages 42 through which a suitable coolant, or in some cases a heating fluid if desired, may be circulated from the manifold shown schematically at 43 in FIG. 1.

The upper die 32 is carried on a movable press member 45, which may be raised and lowered as indicated by the arrow in FIG. 1, through a conventional arrangement such as a hydraulic cylinder or mechanical toggle linkage. The lower die 33 is mounted on the press bed 46. It also includes hook levers 47 arranged to engage in the scarf cavities of the skeleton, and operated by a hydraulic or pneumatic cylinder 48 to hold the skeleton in place for molding and to release when the plate molding operation is complete.

The plastic material to make up the substantial portion of the plate is provided in heated molten form from a conventional injection molding machine 50 which has a discharge nozzle 52 arranged to fit into a socket 53, which in turn communicates with the interior of the mold cavity between the die members 32 and 33. The injection molding machine illustrated in FIG. 1 is of a conventional design, including suitable heaters 54 surrounding the press barrel, and having a screw member 55 which can rotate and also reciprocate within the barrel of the machine. The rotary drive is provided through the drive shaft 57, and reciprocating motion is provided through the hydraulic cylinder device 58. The screw is shown in its withdrawn position, preparatory to receiving a charge of powdered or flaked plastic-molding material 60 from the hopper 61. Various types of thermoplastic-molding material are usable in making plates according to the present invention. One form in particular is a vinyl-molding plastic which can be obtained from discarded mats used in the manufacture of the electrotype shell.

As is known in the art, these mats are formed by molding under pressure to the type, and/or original engravings, making up the printed subject matter to appear on the electrotype shell. The shell is then formed by a plating process on the rear surface of the mat, and after the plates have been made and the mat is no longer useful, it is discarded. This vinyl-molding material can be cut into chips or otherwise made usable in the molding process of the present invention, thus providing further economy in the platemaking operation.

In use of the apparatus, the electrotype shell 10 is placed in the upper die 32, and the partial base or skeleton 15 is placed in the lower die 33. Both of these parts are held securely to the respective dies and the dies are brought together to the molding position, after which the injection molding machine injects sufficient molten plastic material into the molding cavity to cover the rear surface of the electrotype shell and to cover and surround the partial base 15. In particular, due to the offset construction of the crosspieces 18 and the lip portion 21 will be embedded in the plastic material, thus further strengthening and promoting the integral structure of the finished plate.

The scarf cavities 24, being closed and facing downward on the lower die 33, prevent flow of plastic in the lower face of the scarf cavities, thus these cavities are formed during the molding operation, and there is no need for a later machine cutting of these cavities, as has been required in the past. The lower die 33 has the hooks 27 as projections which enter these scarf cavities (FIG. 5) to further assist in centering and registering the base skeleton in the lower die during the molding operation. The molten plastic also will flow through the apertures 21 and around the lip portions 20 of the skeleton, as well as around the crosspieces 18, thereby embedding substantial portions of the skeleton in the resultant plate and contributing to its strength and integrity.

The resulting plate is removed by separating the dies, once the thermoplastic material has completely hardened. In some instances it may be desirable to circulate coolant through the passages 42 to promote this setting operation, depending upon the type of molding plastic being used.

It will be obvious to those skilled in the art that use of the skeleton or partial base members 15 eliminates the need for expensive light metal-reinforcing bases, which are presently used either in solid or perforate form, and which must be discarded along with the plate when it is no longer useful. The skeleton bases, provided by this invention, can be formed by a simple stamping operation, and made of relatively inexpensive sheet metal. It is not necessary that they have substantial structural strength, since they become an integral part of the molded plastic member which forms the major reinforcement for the electrotype shell.

While the method herein described and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

We claim:

1. The method of manufacturing a composite letterpress plate, comprising the steps of:
   a. retaining a shell having a printing surface in the outermost of a pair of curved mating mold cavities with the back surface facing the center of the mold cavity;
   b. forming in the other of said mold cavities a plurality of scarf defining pockets in predetermined position;
   c. bringing the mold cavities into precisely aligned location defining a space of predetermined thickness therewithin;
   d. filling such space with a flowable plastic material under pressure to fill the irregular back surface of the shell and to surround the scarf-defining pockets; and
   e. causing the plastic material to harden thus retaining the desired curved configuration and reinforcement of the shell and defining mounting scarves in the rear surface of the composite plate.

2. The method of claim 1, wherein step (b) includes positioning a reinforcing skeleton including scarf defining pockets in the other of said mold cavities.

3. The method of claim 2, wherein during steps (b) and (c) substantial portions of the skeleton are located spaced within the mold cavity from its walls and are surrounded with the flowable plastic, thus becoming incorporated within the hardened plastic.